US011683679B2

United States Patent
Sasi et al.

(10) Patent No.: US 11,683,679 B2
(45) Date of Patent: Jun. 20, 2023

(54) SYSTEM AND METHOD FOR PRIVACY PROTECTION OF BROADCASTING ID IN UAV COMMUNICATION

(71) Applicant: Samsung Electronics Co., Ltd., Suwon-si (KR)

(72) Inventors: Nivedya Parambath Sasi, Bangalore (IN); Rajavelsamy Rajadurai, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 17/448,840

(22) Filed: Sep. 24, 2021

(65) Prior Publication Data

US 2022/0095100 A1    Mar. 24, 2022

(30) Foreign Application Priority Data

Sep. 24, 2020  (IN) .............................. 202041041541
Sep. 9, 2021   (IN) .............................. 202041041541

(51) Int. Cl.
*H04B 7/185*    (2006.01)
*H04N 7/18*     (2006.01)
(Continued)

(52) U.S. Cl.
CPC .......... *H04W 8/26* (2013.01); *H04B 7/18506* (2013.01); *H04W 12/037* (2021.01);
(Continued)

(58) Field of Classification Search
CPC ... H04W 8/26; H04W 12/106; H04W 12/037; H04W 12/71; H04W 12/06; H04W 12/08; H04W 60/04; H04B 7/18506
(Continued)

(56) References Cited

U.S. PATENT DOCUMENTS 9,524,648 B1    12/2016 Gopalakrishnan et al.
2020/0007825 A1*  1/2020 Jeong ....................... H04N 5/33
(Continued)

FOREIGN PATENT DOCUMENTS

WO    2020051226 A1    3/2020

OTHER PUBLICATIONS

International Search Report of the International Searching Authority in connection with International Application No. PCT/KR2021/013068 dated Dec. 31, 2021, 3 pages.
(Continued)

*Primary Examiner* — Mark G. Pannell

(57) ABSTRACT

The present disclosure relates to a pre-5G or 5G communication system to support higher data rates beyond 4G communication system such as LTE. The present disclosure enables the 3GPP system to protect the broadcasted unique UAV identities for a secured UAV communication. In remote identification process, the UAVs send the messages with flight information to the receiving party (i.e., UTM/USS, a TPAE or another UAV). Also, there are use cases on local broadcast of UAV identities for remote identification and tracking purposes. The present disclosure renders a mechanism that only the authorized personnel is able to decode the received broadcasting ID from the initiating UAV. The present disclosure protects unique UAV identities broadcasted so that, the fake UAV or unauthorized personnel cannot use the broadcasted ID for certain attacks such as impersonation of genuine UAV, tracking of the UAV and so on.

16 Claims, 12 Drawing Sheets

(51) Int. Cl.

| | | |
|---|---|---|
| *G06F 17/00* | (2019.01) | |
| *H04W 8/26* | (2009.01) | |
| *H04W 60/04* | (2009.01) | |
| *H04W 12/06* | (2021.01) | |
| *H04W 12/08* | (2021.01) | |
| *H04W 12/106* | (2021.01) | |
| *H04W 12/037* | (2021.01) | |
| *H04W 12/71* | (2021.01) | |

(52) U.S. Cl.
CPC ........... *H04W 12/06* (2013.01); *H04W 12/08* (2013.01); *H04W 12/106* (2021.01); *H04W 12/71* (2021.01); *H04W 60/04* (2013.01)

(58) Field of Classification Search
USPC .......................................................... 370/316
See application file for complete search history.

(56) References Cited

U.S. PATENT DOCUMENTS

| | | | | |
|---|---|---|---|---|
| 2021/0329460 | A1* | 10/2021 | Liao | ..................... H04L 63/0892 |
| 2022/0277657 | A1* | 9/2022 | Xiang | .................... H04W 12/63 |
| 2022/0279355 | A1* | 9/2022 | Roy | ....................... H04W 12/50 |

OTHER PUBLICATIONS

3GPP TR 23.754 V1.0.0 (Sep. 2020) Technical Report; 3rd Generation Partnership Project; Technical Specification Group Services and System Aspects; Study on supporting Unmanned Aerial Systems (UAS) connectivity, Identification and tracking (Release 17); 124 pages.

Interdigital, "UAV/UAV-C initiated connectivity setup for C2 communication and association" SA WG2 Meeting #139e, S2-2004168r02 (revision of S2-200xxxx), Jun. 1-12, 2020, e-meeting, 5 pages.

Qualcomm Incorporated et al, "KI#1, KI#2, KI#3, KI#7, New Sol: Solution for UAV authentication and authorization by USS/UTM" SA WG2 Meeting #139e, S2-2003798 (revision of S2-200xxxx), Jun. 1-8, 2020, e-meeting, 11 pages.

CATT, "KI # 1&4, Sol#9: Update the solution to clarify unknown UAV tracking" 3GPP TSG-SA WG2 Meeting #140E, 52-2005592 (revision of S2-200xxxx), Aug. 19-Sep. 2, 2020, Elbonia, 3 pages.

Interdigital, "Solution for UAV Authentication and Authorization by UTM using UTM authorization token" SA WG2 Meeting #139e, S2-2004167 (revision of S2-200xxxx), Jun. 1-12, 2020, e-meeting, 5 pages.

Examination report dated Mar. 30, 2022, in connection with Indian Application No. 202041041541, 7 pages.

* cited by examiner

SYSTEM AND METHOD FOR PRIVACY PROTECTION OF BROADCASTING ID IN UAV COMMUNICATION

CROSS-REFERENCE TO RELATED APPLICATIONS

This application is based on and claims priority under 35 U.S.C. § 119(a) of an Indian Provisional patent application number 202041041541 filed on Sep. 24, 2020, in the India Patent Office, and of an Indian Non-Provisional patent application number 202041041541, filed on Sep. 9, 2021, in the India Patent Office, the disclosure of each of which is incorporated by reference herein in its entirety.

BACKGROUND

1. Field

The present disclosure relates generally to a communication system, and more particularly, to a system and method of operation of uncrewed aerial vehicles (UAVs).

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An uncrewed aerial system (UAS) model as depicted in FIG. 1 is the combination of an uncrewed aerial vehicle (UAV), sometimes called a drone, and a UAV controller. Each UAS consist of one UAV Controller and one UAVs, all of them have their own remote identity. In 3GPP standard specifications, TS 22.125, TR 22.825, and TR 22.829, use cases and requirements for secured UAV communication are described, including connectivity, identification, tracking and authorization.

In TR 23.754, the extent to which the 3GPP system can enable UAS components to establish the necessary connectivity between each other and UAS traffic management (UTM) for both line of sight connectivity and non-line of sight connectivity, and on the detection and reporting of unauthorized UAVs towards the UTM is described. TR 23.755 captures the impact on the application layer in order to support the scenarios, in particular the application support or enabler functionalities for UTM and the service interactions between UAS and the UTM (e.g., fly route authorization, location management, group communication support).

Local broadcast of a UAS identity provides a backup means of ID and tracking if the network is compromised, degraded, or unavailable. The local broadcast of a UAS identity allows airspace enforcement or other authorized personnel with the appropriate equipment to discover UAS within proximity. FIG. 2 depicts as state-of-the-art data acquisition by law enforcement. UAV Identification and broadcasting ID needs certain privacy in order to secure the UAV communication. The privacy issue related local broadcast of UAS ID is covered in TR 22.825.

SA2 TR 23.754 has certain solutions on UAV identities allocation and usage for remote identification, which defines the format of broadcasting ID or CAA level UAV ID. Also provides multiple options for the CAA level UAV ID assignment and resolutions: in particular, provides options based on mechanisms similar to ProSe discovery, without implying the use of PC5. The 3GPP system supports a direct UAV to UAV local broadcast communication transport service which can transmit messages with an end-to-end latency According to the existing requirements in TR 22.825, the UAS locally broadcasts its identity and location. And the locally broadcast information may not expose personally identifiable information to general users. At the same time, the authorized end user or authorized personnel has access to the broadcasting ID and it is possible for them to listen the broadcast message.

The term "UAV" and "uncrewed aerial vehicle" are used interchangeably to address the UAV UE who participates in the UAV communication.

The term "UAV-C" and "UAVC" are used interchangeably to address the UAV Controller who participates in the UAV communication.

The term UAV ID or UAV identity are used interchangeably to address the unique identities of the UAVs.

The term "temporary ID," "temp ID," and "broadcasting ID" are used interchangeably to indicate the UAVs identity used during broadcast.

FIG. 3 depicts a state-of-the-art UAV architecture. According to TR 22.825, Unmanned aerial system traffic management (UTM) is a 3GPP entity which is responsible for the authorization of UAS to operate and checks the credentials of the UAS and UAV operator. As a UAS requests permission to access UAS data services from an MNO, the MNO performs a secondary check (after or in parallel to the initial mutual authentication) to establish the UAS credentials to operate. The MNO is also responsible for transporting and potentially adding additional data to the request to operate from the UAS to an UTM.

Ongoing study in SA2 for supporting unmanned aerial systems (UAS) connectivity, Identification and tracking discusses about the issues in UAV identification, UAV authorization by UTM, UAV controller identification and authorization or authentication, UAV and UAV controller tracking, UAV authorization revocation and (re)authorization failures, UAV controller and UAV association, and user plane connectivity for UAVs. However, there are security and privacy aspects that need to be addressed. On the other hand, local broadcast of UAS identities leads to certain privacy related issues in UAV communication.

SA1 TR 22.825 provides the use case on local broadcast of UAS identity A UAV identifier (UAV ID) is needed for remote identification purposes, as indicated in regulatory requirements (e.g., FAA indicates that it can be as simple as a serial number or can be some form of session ID); FAA reckons some privacy is needed for such identifier in broadcasting scenarios.

Considering the editor's note in solution #9 from SA2 TR 23.754, there is a need to address the privacy or confidentiality requirements which is applicable for the unique UAV temporary identity in the case of remote identification and broadcasting scenarios.

It is necessary for the 3GPP system to protect the UAS identities in order to prevent spoofing attacks of the UAS identities. Apart from that, the UAS identities used for broadcasting need privacy protection. There may be a mechanism that only the authorized personnel is able to decode the received broadcasting ID from the initiating UAV.

There is need for protection of the unique UAV identities broadcasted so that, the fake UAV or unauthorized personnel cannot use the broadcasted ID for certain attacks such as impersonation of genuine UAV, tracking of the UAV and so on. Moreover, it is necessary that the broadcasting ID may not disclose any of the personal details of the UAV. i.e., UAV's owner identity, owner address, owner contact details, owner certification etc. Therefore, protection of broadcasting UAS ID is a security challenge that needs to be addressed in UAV communication. Also, in order to prevent the tracking of UAV broadcasting identities, certain refreshing methods can be supported by UAV UE, 3GPP network and the USS/UTM.

Thus, there is a need for a solution that overcomes the above-mentioned deficiencies.

SUMMARY

This summary is provided to introduce a selection of concepts in a simplified format that are further described in the detailed description of the disclosure. This summary is not intended to identify key or essential inventive concepts of the disclosure, nor is it intended for determining the scope of the disclosure.

The present disclosure refers a broadcasting ID protection in accordance with an embodiment of the present disclosure. The method for a broadcasting ID protection comprises mutually authenticating a network trusted entity UTM and an unmanned aerial vehicle (UAV) UE based on storing the list of UAVs by the UTM. A registration request is sent by the UAV UE to the UTM based on including at-least one of UAV ID, international mobile equipment identity (IMEI), owner details, other possible parameters in a request message. A UAV traffic management (UTM) system receives from a UAV, a registration request message. The UTM authorizes the UAV if the received credentials match with locally stored credentials in the UTM.

The civil aviation authority (CAA) is a government statutory authority in each country that maintains an aircraft register and oversees the approval and regulation of civil aviation. Basically, CAAs are responsible for the oversight and regulation of civil aviation with a focus on aviation safety, security, airspace policy, economic regulation, efficiency, sustainability, consumer protection and respect for the environment. The CAA has an important role in improving aviation safety standards. It constantly attempts to bring lasting improvements in aviation systems, the culture of aviation, its capabilities, and any processes that are carried out. It also tries to meet certain standards as an organisation, aiming to remain efficient as well as effective. A civil aviation authority (CAA) and/or the assigns a new CAA level UAV ID for the UAV based on the registration request. Accordingly, the UTM receives the new CAA level UAV ID in a response message and stores the received CAA level UAV ID for the corresponding UAV ID. The UTM sends the registration-accept message to the UAV UE based on including the newly assigned CAA level UAV ID corresponding to the UAV ID in the registration accept message.

The present disclosure at least enables the 3GPP system to protect the UAS identities in order to prevent spoofing attacks of the UAS identities and renders privacy protection to the UAS identities used for broadcasting. The present disclosure renders a mechanism that only the authorized personnel is able to decode the received broadcasting ID from the initiating UAV. Also, in order to prevent the tracking of UAV UE's, there is a need for certain re-allocation procedures to secure the UAV communication to avoid the tracking issue which may occur due to continuous use of same ID.

The present disclosure protects unique UAV identities broadcasted so that, the fake UAV or unauthorized personnel cannot use the broadcasted ID for certain attacks such as impersonation of genuine UAV, tracking of the UAV and so on. Moreover, the broadcasting ID conceals the personal details of the UAV. i.e., UAV's owner identity, owner address, owner contact details, owner certification etc. In addition, to prevent the tracking of UAV broadcasting identities, the present disclosure renders refreshing methods supported by UAV UE, 3GPP network and the USS/UTM.

The present disclosure refers a broadcasting ID protection in accordance with an embodiment of the present disclosure. The method for a broadcasting ID protection comprises mutually authenticating a network trusted entity UTM and an unmanned aerial vehicle (UAV) UE based on storing the list of UAVs by the UTM.

A registration request is sent by the UAV UE to the UTM based on including at-least one of UAV ID, international mobile equipment identity (IMEI), owner details, other possible parameters in a request message. A civil aviation authority (CAA) assigns a new CAA level UAV ID from the UTM based on the registration request. Accordingly, the UTM receives the new CAA level UAV ID in a response message and stores the received CAA level UAV ID for the corresponding UAV ID. The UTM sends the registration accept message to the UAV UE based on including the newly assigned CAA level UAV ID corresponding to the UAV ID in the registration accept message.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
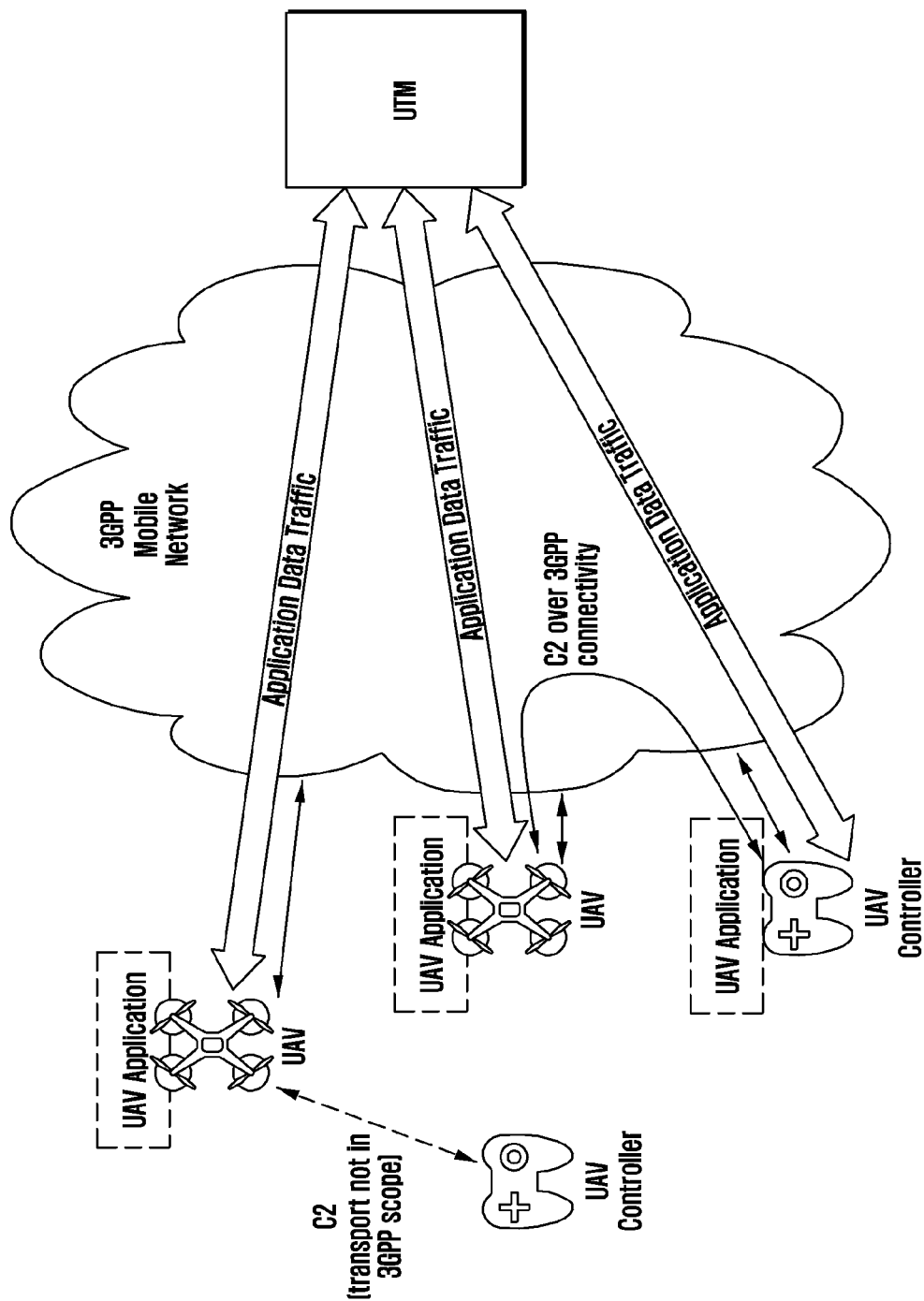
FIGS. 1 to 3 illustrate a state-of-the-art scenario pertaining to UAV.
Figure 2:
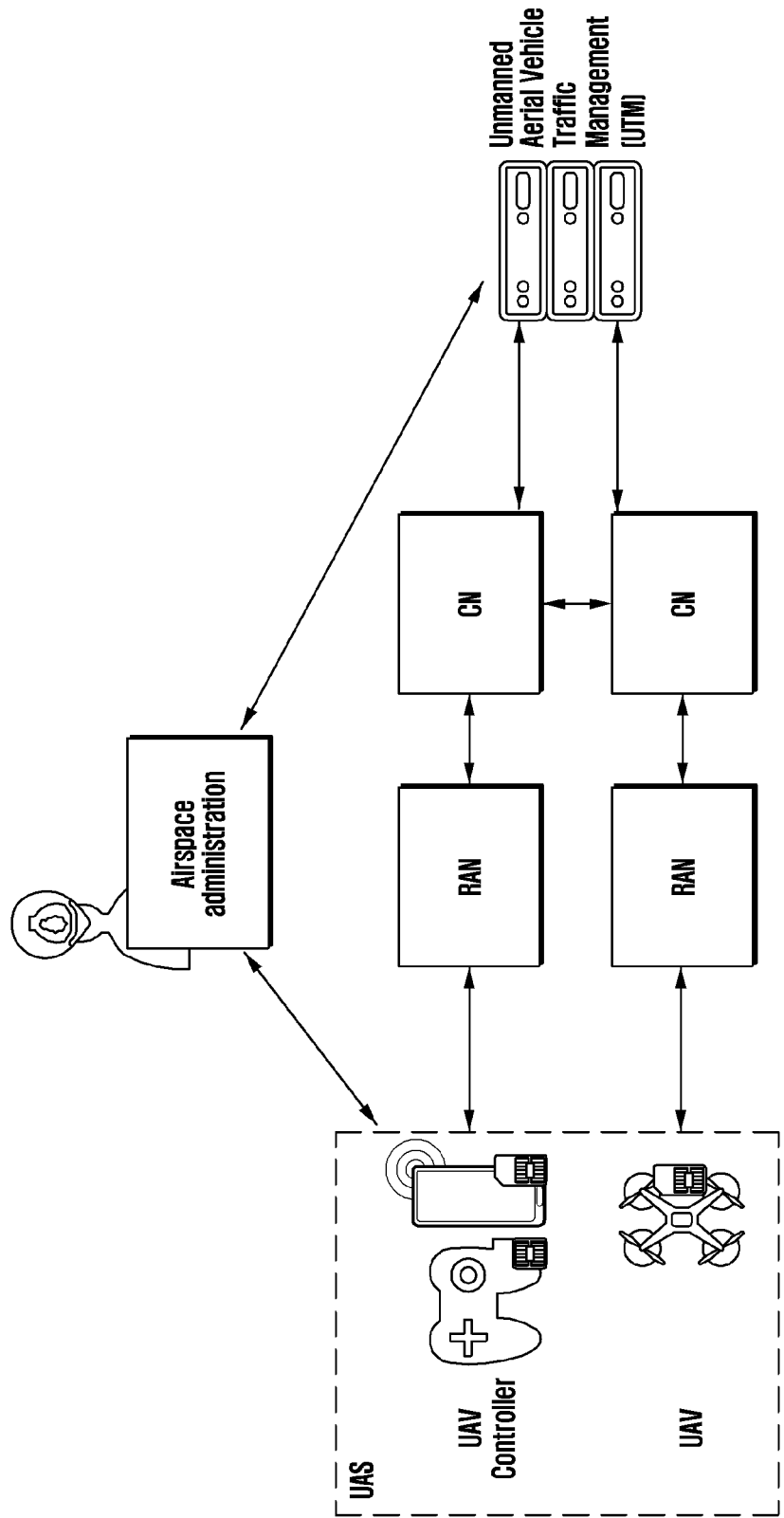
Figure 3:
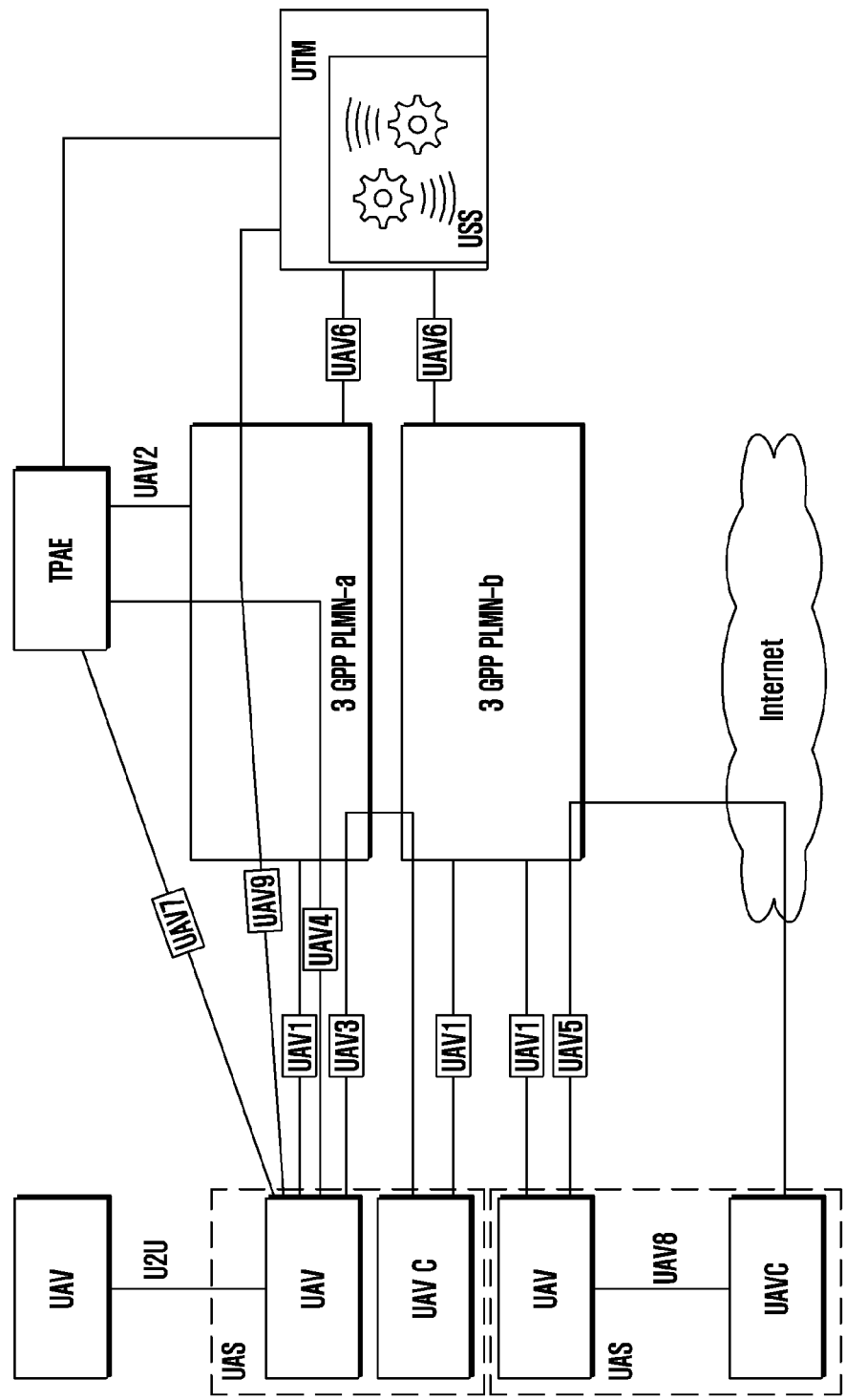

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understand the embodiments of the present disclosure so as not to obscure the drawings with details that will be readily apparent to those of ordinary skill in the art having benefit of the description herein.

DETAILED DESCRIPTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying drawings.

Figure 4A:
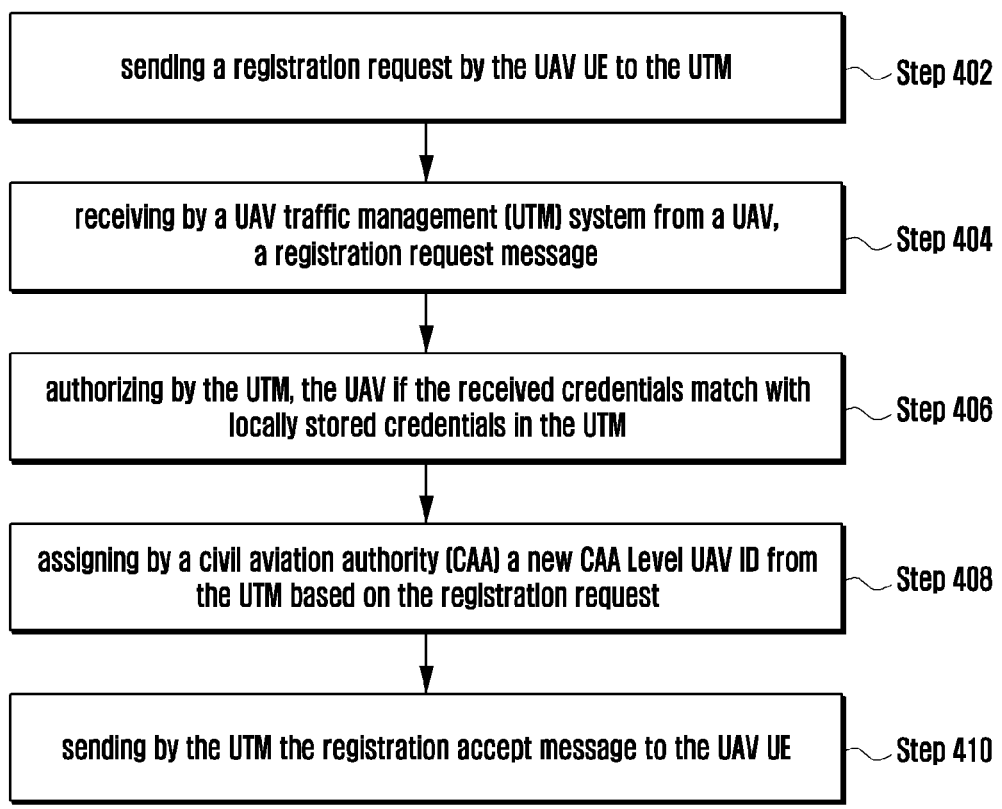
FIGS. 4A and 4B illustrate a temp ID allocation procedure and a temp ID/broadcasting ID protection in accordance with an embodiment of the present disclosure.
Figure 4B:
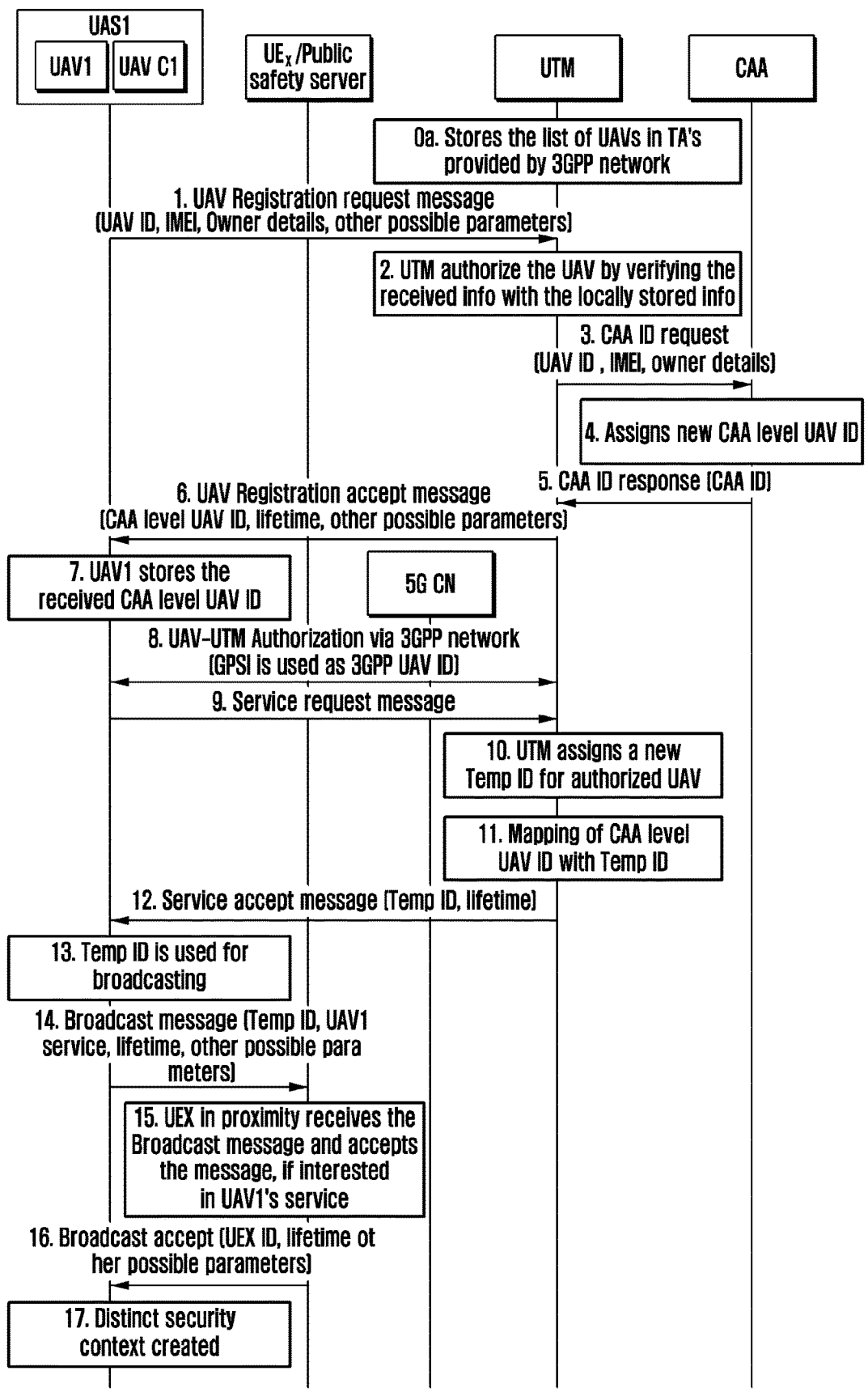

FIGS. 4A and 4B illustrates a Temp ID allocation procedure and a temp ID/broadcasting ID protection in accordance with an embodiment of the present disclosure;

FIG. 4A illustrates a broadcasting ID protection in accordance with an embodiment of the present disclosure.

The method for a broadcasting ID protection comprises mutually authenticating a network trusted entity UTM and an unmanned aerial vehicle (UAV) UE based on storing the list of UAVs by the UTM. A registration request is sent (step 402) by the UAV UE to the UTM based on including at-least one of UAV ID, International Mobile Equipment Identity (IMEI), owner details, other possible parameters in a request message. The UAV traffic management (UTM) system receives (step 404) from the UAV, a registration request message including UAV credentials comprising at least one of an UAV ID, international mobile equipment identity (IMEI) or owner details.

At step 406, the UTM authorizes the UAV if the received credentials match with locally stored credentials in the UTM.

At step 408, a civil aviation authority (CAA) assigns (step 408) a new CAA level UAV ID from the UTM based on the registration request. More specifically, the registration accept message including the CAA level UAV ID comprises:

sending by the UTM after UAV authorization, a CAA level UAV ID request to a CAA for the corresponding UAV ID based on UAV credentials including at least one of UAV ID, IMEI, owner details;

assigning by the CAA, the CAA level UAV ID based on the received request; and receiving by the UTM, the CAA level UAV ID from the CAA.

Accordingly, at the same step 408, the UTM receives (step 408) the new CAA level UAV ID in a response message and stores the received CAA level UAV ID for the corresponding UAV ID.

At step 410, the UTM sends (step 410) the registration accept message to the UAV UE based on including the newly assigned CAA level UAV ID corresponding to the UAV ID in the registration accept message. The UAV stores the received CAA level UAV ID included in the registration accept message.

In further embodiments as depicted in FIG. 4B, the UTM receives via a 3GPP network, a service request message from the authorized UAV. The UTM, based on receiving the service request, assigns a temporary ID to UAV. The UTM performs a mapping of the stored CAA level UAV ID for the authorized UAV UE with the assigned temporary ID for tracking and remote identification of UAV UE. The UTM sends a service accept message to the UAV UE comprising the temporary ID along with a temporary ID's lifetime information.

Further, the UAV initiates a broadcast message announcing a UAV service comprising the UAV service messages and temporary ID along with the lifetime. A public service UE (UEX) and/or any other UE (airspace enforcement or any other authorized personnel with the appropriate equipment) within the proximity receives the message broadcasted by the initiating UAV. The public service UE accepts the message if interested in UAV's service. The initiating UAV UE receives the response messages from the UAVs interested in delivering the services along with their lifetime.

In an example, the sending of the broadcast message by the UAV UE comprises:

a) forming the broadcast message for a particular UAV service;

b) calculating MIC if an integrity key for UAV message broadcast (IKUMB) provided by the UTM, otherwise setting MIC to NULL;

c) adding message-specific confidentiality to the message with UTM ID, if a confidentiality key for UAV message broadcast (CKUMB) was received; and d) adding scrambling over the message if the scrambling key for UAV message broadcast (SKUMB) was received from the UTM.

In other example, the method for receiving the broadcast message by the UAV UE comprises:

a) removing scrambling if the SKUMB was received from the UTM;

b) checking for match on the bits of the message that are not encrypted using message specific confidentiality and aborting in case of no match;

c) removing message-specific confidentiality if the CKUMB was received from the UTM;

d) checking for full match if only a match on non-encrypted bits was found, and aborting the message if no match; and e) optionally performing the MIC check.

FIG. 4B illustrates a broadcasting ID protection in accordance with an embodiment of the present disclosure. In an embodiment, it is assumed that the UTM (third party entity) is initially authorized by the 3GPP network. The UAV sends the authentication/authorization request to the 3GPP system and simultaneously to the USS/UTM through the common interface between the UAV and the USS/UTM.

In another embodiment, the execution of A&A procedure between the UAV and the USS/UTM where 3GPP provides communication between UAV and USS/UTM. For this communication, first the UAV needs to execute primary authentication, so the UAV and the 3GPP system execute mutual authentication. When the UAV wants to get UAV related service, the 3GPP system allows the UAV to communicate with the UAS AF located in the inside of the operator network. The UAS AF and the USS/UTM communicates via NEF framework which requires mutual authentication.

The UTM assigns a unique temporary ID for broadcasting purpose thereby the original UAV ID (which is known to network and UTM) and the personal owner details remain confidential.

As a part of procedure, following steps are performed:

Step 0*a*. UTM is a trusted entity at network point of view. Both UAV and network mutually authenticate and get authorized.

In an embodiment, the 5G core network provides the list of authorized UAVs in the tracking area for UAV communication to the UTM. UTM stores the received UAV list locally for further authentication or authorization process. This solution considers only one USS per region.

In another embodiment, it is considered that there can be more than one USS per region. Region in some geographies may correspond to a country or a set of countries.

Step 1: The UAV send registration request to the UTM. The UAV UE includes at least one of the following parameters in the request message: UAV ID, IMEI, owner details, or other possible parameters.

The UAV ID can be an identifier which is used for UTM registration and verification. This ID may be known to the CAA for the UAV verification and for assignment of CAA level UAV ID. In another embodiment, the UAV ID is CAA level UAV ID.

The IMEI (hardware ID) is included in the registration request message in order to have a successful hardware verification at the UTM.

The UAV owner details include, owner identity, owner address, owner contact details, owner certification etc. UTM may use this UAV ID and owner details to query the UAV flight details during the UAV communication.

In another embodiment, the UE registers to the network and is authorized for UAV communication. The UTM may be involved in the authorization procedure.

Step 2: on receiving the registration request from the UAV, the UTM checks for the locally stored information, which can be either pre-configured or provided by the civil authorized authority (CAA). If the received UAV credentials match with the stored credentials, UTM considers the UE as an authorized UAV. If not, the UTM rejects the request.

Step 3: UTM initiates CAA ID request to the civil aviation authority. The UTM includes at least one of the following parameters in the request message: UAV ID, IMEI, Owner details etc.

CAA level UAV ID is the "aviation level" identity, assigned by functions in the aviation domain (e.g., USS), and used for remote broadcasting.

Step 4: the CAA assigns a new CAA level UAV ID based on the request from the UTM. The CAA is informed about the authorized UAV details for secured UAV communication.

In another embodiment, the USS is assigning a CAA level UAV ID to the corresponding UAV ID once there is a successful mutual authentication between the UAV and the UTM.

Step 5: UTM receives new CAA level UAV ID in CAA ID response message. After receiving the new CAA level ID, the UTM stores the received CAA ID for the corresponding UAV.

Step 6: UTM sends the registration accept message to the UAV. This message includes the newly assigned CAA level UAV ID.

Step 7: UAV 1 stores the received CAA level UAV ID once the registration procedure is completed with the UTM/USS.

Step 8: UAV UE and the UTM is authorized via 3GPP network as based on the SA2 procedures. The 3GPP assigned UAV external identifier i.e., GPSI is used as a 3GPP UAV ID for authorization purposes.

UAV 3GPP authentication/authorization may be performed by the core network when the UAV accesses the 3GPP system to ensure the UAV has successfully registered with USS/UTM and has therefore been authorized for operations by the USS/UTM.

The UAV includes a CAA level UAV identity (which is obtained from the UTM in step 6) to the 3GPP system in the service request message. The 3GPP system determines whether to initiate UAV authentication/authorization based on request from UAV, subscription, local policies, and results of previous authentication/authorization. The USS/UTM can revoke such UAV authorization.

Step 9: once the UAV and the UAV-C establishes the User Plane paths (UAV 9) with the US S/UTM and have successfully authenticated and authorized by the US S/UTM for UAV operations, UAV UE sends service request message to the UTM via the 3GPP network (i.e., using UAV 9 interface UAV UE contacts the UTM/USS).

Step 10: after receiving the service request, UTM assigns a new temporary ID for the authorized UAV. The UAV uses this newly assigned temporary ID for further broadcasting. Temporary ID format is as follows:

Temporary ID=Broadcasting ID=<PLMN ID><IMEI><UTM ID>; and

Temp ID is provided by the UTM for each UAV traffic session and it is known to the 3GPP network.

Using PLMN ID, the receiver can obtain the details about the network in which the initiating UAV is authorized for.

UTM ID is used to differentiate, in case if there are multiple UTM available in the region whereas, UTM ID is the FQDN of the UTM. Hence, by broadcasting this temporary ID, the UAV's owner details remain confidential among the network, UTM and the initiating UAV.

Step 11: UTM performs a mapping of the stored CAA level UAV ID for that particular UAV UE with the newly assigned temporary ID for further tracking and identification of UAV.

Step 12: once the mapping is completed, UTM sends the service accept message to the UAV UE. The message includes Temporary ID along with the Temp ID's lifetime to the UAV Step 13: temporary ID is used for broadcasting as the temporary ID does not provide any owner related personal information and also as the temporary ID is temporarily valid for certain interval of time, the attacker may not be able to track the UAV further.

Step 14: the initiating UAV UE initiates a broadcast message announcing a UAV service. The initiating UE includes the UAV service messages, temporary ID along with the lifetime.

Step 15: the UEX in proximity receives the broadcast message and accepts the message, if interested in UAV 1's service.

In an embodiment, the monitoring entities (e.g., TPAE) use the UAV ID to identify the "resolver" for the identity. Once the TPAE identifies the network function to contact, the TPAE sends a query containing the UAV ID to obtain the UAV information.

In another embodiment, the multiple UAV UE's or other public safety service UE within the proximities is receiving the broadcast message and the UAV's interested in respective services are responding back.

Step 16: the initiating UE receives the response messages from the UAVs interested in the services along with their lifetime.

Step 17: distinct security context create procedure is followed as provided in the V2X broadcast solutions as described in TR 33.836

In an embodiment, it is assumed that UAV and the UTM/USS support an end-to-end protection and the UAVs identities are made available at the UTM/USS (for e.g., preconfiguring).

The aforesaid explanation may be referred as alternative-1. In yet another implementation referred as alternative-2 and, in an embodiment, the USS assigns a Temporary ID for broadcasting.

As in alternative-1, UTM is providing a CAA level UAV ID in registration accept message to the UAV. Based on the service request and authorization result, the USS assigns a new temporary ID which can be used for broadcasting purpose.

The procedure is same as in alternative-1, but in this alternative USS provides a temporary ID i.e., a randomly generated alphanumeric code.

Temp ID is provided by the USS for each UAV traffic session and it is known to the 3GPP network.

Temporary ID=Broadcasting ID=A randomly generated alphanumeric code assigned by a USS on a per-flight basis designed to provide additional privacy to the operator.

In another embodiment referred as Alternative-3, UTM is providing the security parameters to UAV for broadcasting in the registration accept message. The security procedures that are applied at the sending and receiving UE are controlled by the UTM.

As a part of detailed procedure, the initiating UE receives the security parameters for broadcasting from the UTM.

It includes integrity Key for UAV message broadcast (IKUMB), confidentiality key for UAV message broadcast (CKUMB), scrambling key for UAV message broadcast (SKUMB), refreshing parameter, CAA level UAV ID, Temp ID and the UTM ID.

Refreshing parameter can be a UTC based counter, which is one of the inputs for the keystream calculation.

UTM ID is added as another input for keystream calculation. The advantage of adding UTM ID is that a receiver (any UE or the public service UE or TPAE or UAV C) can contact or query the UTM directly (whenever needed during UAV communication).

In an embodiment Temp ID is considered as the broadcasting ID for UAV communication, which is a unique identity to the UAV, which may preferably be having a temporary validity. The 3GPP network entity (for e.g., AMF) maintains the temp ID allocation status and its lifetime expiry details).

In respect of masking/protecting the broadcasting message, the broadcasting messages are protected in three ways as follows.

In one example, integrity protection is provided by appending a MIC. The MIC is calculated in the sending/initiating UAV UE using a received IKUMB and may either be checked at the receiving UE using the supplied IKUMB or by provided by the UTM at the receiver end.

In another example, scrambling protection, which ensures that there is no relationship between the broadcasting UAV UE, i.e., to prevent tracking of a UE over time.

In yet another example, a message-specific confidentiality, which provides confidentiality protection for part of the broadcasting message. This is used either when several UEs use the same SKUMB or if it is desired to make some part of the broadcasting message unclear from some of the UEs that are allowed to be in UAV communication.

The UAV sending a broadcast message performs the following steps:

Step 1: formation of the broadcast Message for a particular UAV service (e.g., add Suffix if only Prefix was allocated). The format of the broadcasting message needs to be maintained throughout the service period and it may not be possible for an attacker to decode the broadcasted message;

Step 2: calculate MIC if an IKUMB was provided by the UTM, otherwise set MIC to all zeros;

Step 3: add message-specific confidentiality to the message with UTM ID, if CKUMB was received;

Step 4: append the MIC to the output of step 3; and

Step 5: add the scrambling over the output of step 4 if the SKUMB was received.

The UE receiving a broadcast message performs the following steps:

Step 1: undo scrambling (as in step 5 of sending UAV) if a SKUMB was received from the UTM or the SKUMB is already received from the initiating UE side;

Step 2: check for match on the bits of the message that are not encrypted using message specific confidentiality. If no match, then abort the message;

Step 3: undo message-specific confidentiality if a CKUMB was received (as in step 3 of sending UAV) from the UTM;

Step 4: check for full match if only a match on non-encrypted bits was found in 3. If no match then abort the message; and Step 5: if a MIC check is required, check MIC directly.

In an embodiment, the MIC value is calculated for broadcasting messages as follows:

In one example, for calculating a MIC using the broadcasting key for UAV communication, the parameters include to form the input S to the KDF are: message type, CAA level UAV ID, TEMP ID, UTC-based counter, UTM ID.

In another example, the MIC is set to the 32 least significant bits of the output of the KDF.

Apart from the procedure described in TR 33.303 for ProSe, this approach includes the UTM ID and CAA level UAV ID as additional input to the KDF to have a uniqueness for UAV communication and to have an additional procedure for the receiver to contact the UTM (based on the received UTM ID), if needed.

In another embodiment, for scrambling calculation, the sending UE does the following:

Step 1: set the 4 LSBs of the UTC-based counter equal zero, for the purpose of this scrambling calculation only;

Step 2: compute the time-hash-bit sequence from SKUMB and the UTC-based counter (modified as in step 1), passed through a keyed hash function; and Step 3: XOR the time-hash-bit sequence with the entire broadcasts message (including MIC) being processed.

At the receiving end (for e.g., UAV UE/Public service UE/TPAE/UAVC), the receiving end performs the exact same steps except applied to the received message being processed.

In another embodiment, for message-specific confidentiality description; the sending UE does the following:

Step 1: compute Key_mask=(Enc_bits_mask XOR 0xFF . . . FF)||0xFFFFFFFF;

Steps 2: calculate Keystream=KDF (CKUMB, CAA ID, Temp ID, UTM ID, UTC-based counter, (Key_mask AND (Message||MIC))); and Step 3: XOR (Keystream AND Enc_bits_mask) into the message.

At the receiving UE, the UE performs the exact same steps except applied to the received broadcast message being processed.

Figure 5:
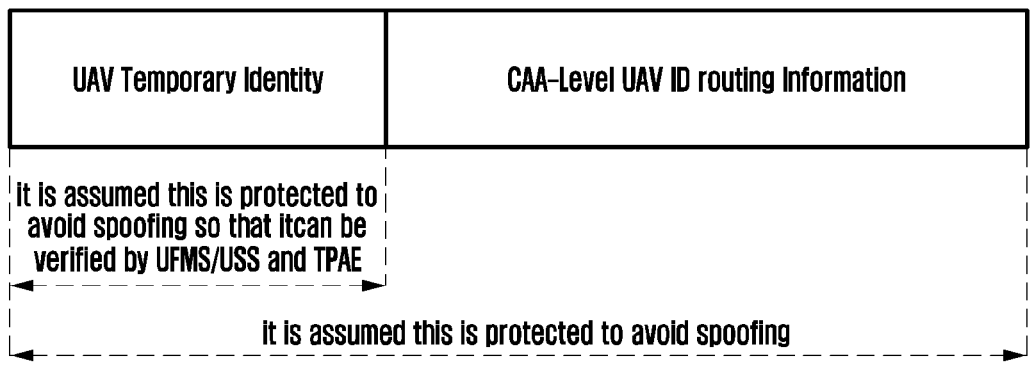
FIG. 5 illustrates CAA level UAV ID logical/functional format in accordance with an embodiment of the present disclosure.

FIG. 5 illustrates CAA level UAV ID logical/functional format in accordance with an embodiment of the present disclosure.

In an embodiment referred as Alternative 4, solution #9 of TR 23.754 is considered as prior art for broadcasting ID definition.

In solution #9 of SA2 TR 23.754, a UAV flight enablement subsystem (UFES) is aware of both the CAA level UAV ID and 3GPP UAV ID, which is used within 3GPP system (e.g., this may be one or a combination of PEI, IMSI, SUPI, and external identifier). Apart from that, the UFES maintains the mapping between the two.

In an embodiment, the UAS AF is having the mapping of 3GPP UAV ID and CAA level UAV ID.

In another embodiment, the UAS AF is having the mapping of the 3GPP UAV ID and the assigned Temp ID for broadcasting.

Functional assumptions about the CAA level UAV ID for remote identification is that the CAA-level UAV ID used for remote identification contains at least the following information:

An identity unique to the UAV, which may preferably be temporary validity: this identifies uniquely the UAV with the entity that allocates the CAA-level UAV ID.

According to this solution, the UE obtains the CAA level UAV ID from the UFES or the USS, and uses the CAA level UAV ID for remote identification messages.

In case of UFES allocation, the UFES allocates the CAA level UAV ID and provides the CAA level UAV ID to the USS. In that case, the UFES maintains a list of CAA level UAV list for all the authorized UAVs for further UAV contact information.

In case of UFES-assisted allocation, the UFES provides information to the USS for allocation of the CAA level UAV ID, and specifically the CAA level UAV ID routing information that allow a querying TPAE to discover and address the UFES. The USS returns the actual CAA level UAV ID to the UFES.

In an embodiment, it is optionally possible that, the CAA-level UAV ID routing information, used by an entity attempting to retrieve the UAV data to identify and address the appropriate entity (i.e., UFES or USS).

Both USS-assigned CAA level UAV ID and 3GPP Assisted CAA level UAV ID Assignment are supported, as described in solution #9 of TR 23.754.

In this alternative for the UAV identification and UAV broadcasts, the CAA level UAV ID which is expected to be protected against spoofing (i.e., to avoid impersonation) and for confidentiality (i.e., protected between the UAV and the USS) is provided.

The protected broadcasted ID need to be verifiable by the TPAE or any other authorized personnel by querying the USS to retrieve the UAV information (e.g., UAV hardware ID, UAV pilot, UAV operator, etc. Apart from that the UAV dynamic flight information (e.g., height, direction, speed, etc.) is protected from spoofing and verifiable by the received party (e.g., a TPAE or another UAV or any authorized personnel).

The broadcasting ID is defined as follows:
Broadcasting ID=UAV Temp ID||CAA-level UAV ID.

The broadcasting ID is protected in the same way (encryption, scrambling and MIC integrity protection) as described in alternative-3. The format of Temp ID can be one of the alternatives provided in FIG. 6.

Figure 6A:
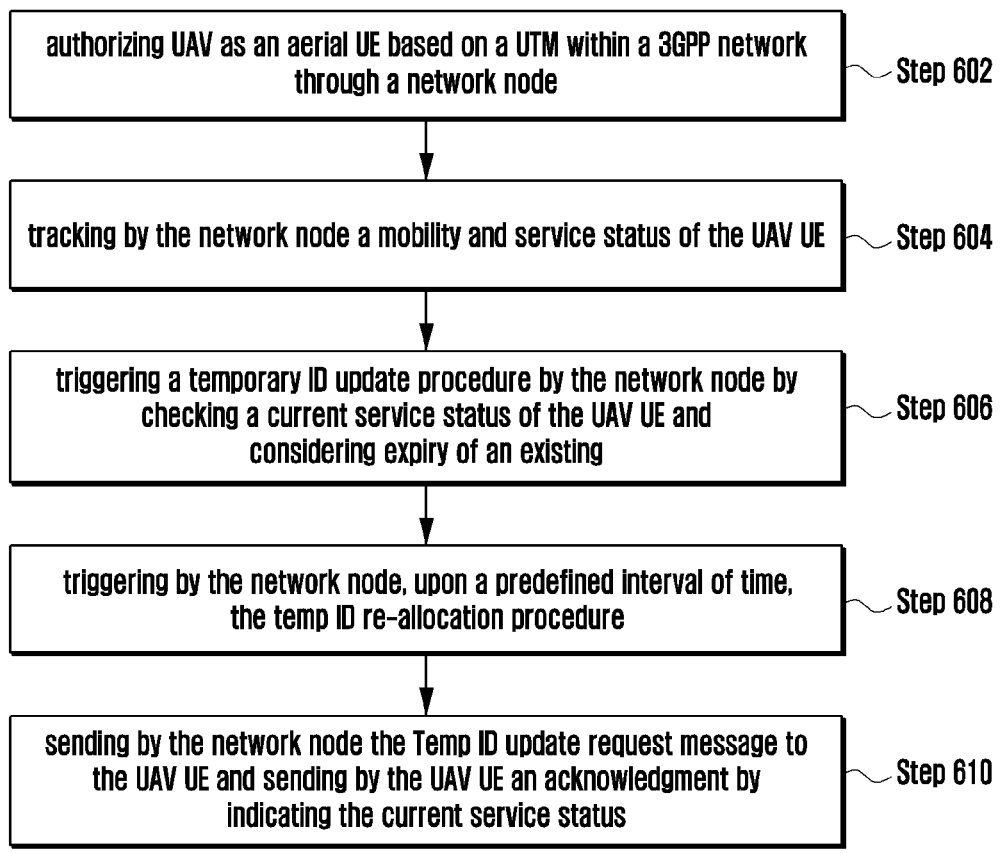
FIGS. 6A and 6B illustrate temp ID re-allocation triggered by AMF in accordance with an embodiment of the present disclosure.
Figure 6B:
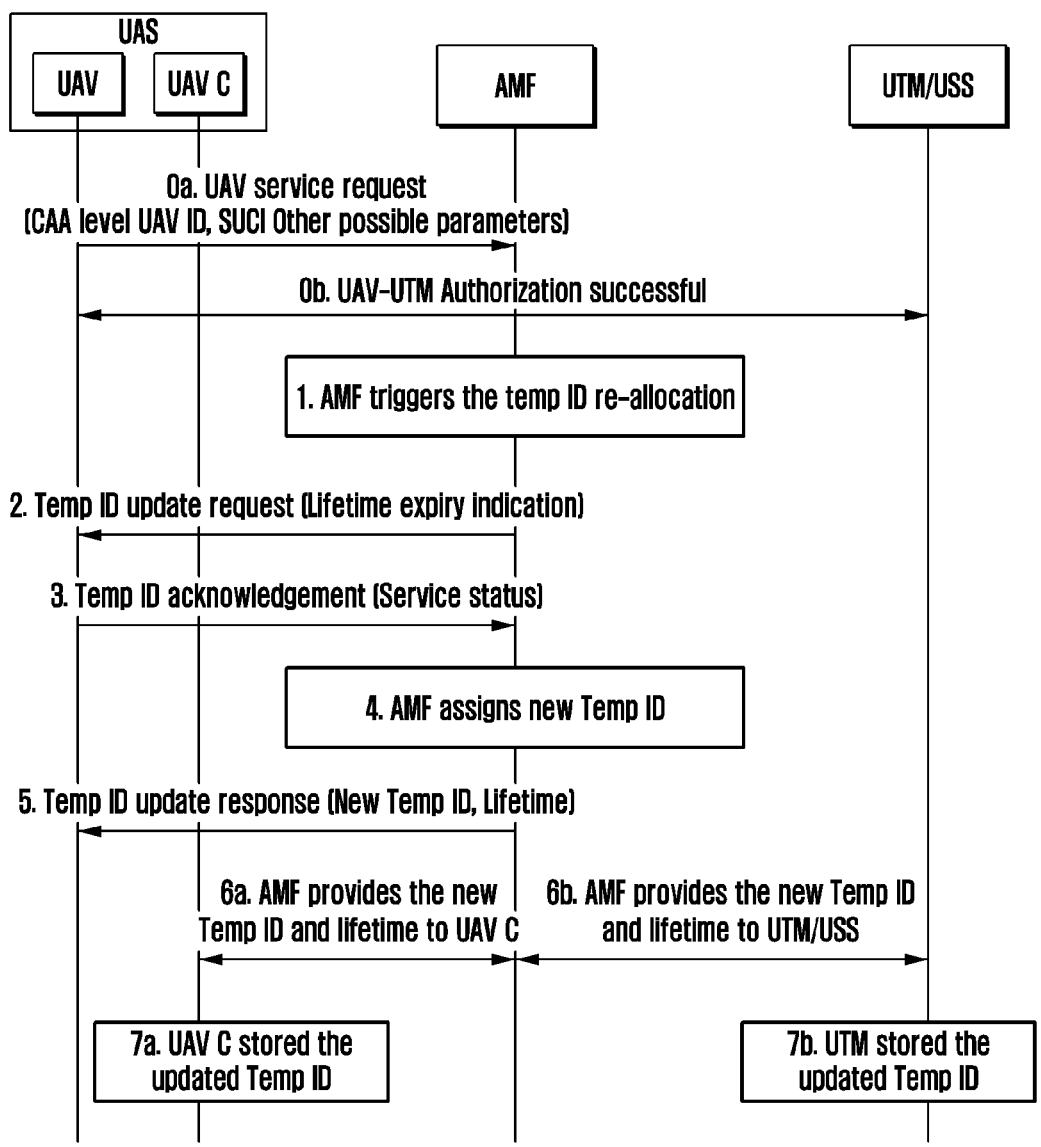

FIGS. 6A and 6B illustrate Temp ID re-allocation triggered by AMF in accordance with an embodiment of the present disclosure.

FIG. 6A illustrates a method for temporary ID re-allocation by AMF in a 3GPP network. The method comprises authorizing UAV (step 602) as an aerial UE based on a UTM within a 3GPP network through the access and mobility management function (AMF) assigning a temporary ID and informing the assigned ID to the UTM.

An AMF is tracked (step 604) by a mobility and service status of the UAV UE. A temporary ID update procedure is triggered by the AMF (step 606) by checking a current service status of the UAV UE and considering expiry of an existing temp ID lifetime. The AMF triggers (step 608), upon a predefined interval of time, the temp ID re-allocation procedure. The AMF sends (step 610) the Temp ID update request message to the UAV UE.

FIG. 6B illustrates Temp ID re-allocation triggered by AMF in accordance with an embodiment of the present disclosure.

The present implementation refers an Alternative-5 referred by re-allocation trigger from the network.

The network and the UAV UE support the re-allocation mechanism for the temp ID. The Temp ID is assigned by the UTM per service request and AMF is aware of the temp ID allocation. If the assigned old Temp ID's lifetime is about to expire, the AMF triggers the Temp ID allocation procedure.

In this alternative, Temporary ID=Broadcasting ID=<PLMN ID><IMEI><UTM ID><RAND>.

In another embodiment, Temporary ID=Broadcasting ID=<PLMN ID><IMEI><UTM ID><COUNTUAV>.

In one example, Temp ID is provided by the UTM for each UAV traffic session and it is known to the 3GPP network.

In another example, using PLMN ID, the receiver can obtain the details about the network in which the initiating UAV is authorized for.

In yet another example, UTM ID is used to differentiate, in case if there are multiple UTM available in the region.

In yet another example, the UAV and the AMF associates a counter, CounterUAV, with the Temp ID. The CounterUAV can be incremented by the AMF for every new computation of the Temp ID. The CounterUAV is used as freshness parameter for Temp ID generation, to mitigate the replay attack and tracking of the broadcasting ID, which is used for remote identification. The UE and the AMF maintains the CounterUAV for lifetime of the Temp ID.

The UAV initializes the CounterUAV to "0" when the Temp ID is allotted.

The UAV only accepts the CounterUAV value that is greater than stored CounterUAV value.

The UAV and the AMF maintains the CounterUAV for lifetime of the previously allotted Temp ID.

In another embodiment, the AMF performs the mapping of temp ID and CAA level ID for a particular UAV UE at the network side.

In this alternative, the temp ID is considered as the broadcasting identifier which can be periodically refreshed by the network. The AMF triggers the periodic temp ID allocation in order to prevent the tracking of UAV UE during its service period. Also, the assigning of new temp ID is performed only after receiving the current service status from the UAV UE in order to avoid the service interruption.

As a part of detailed procedure, following steps of operation take place:

Step 0a-0c: the UAV is authorized as an aerial UE with the help of UTM and 3GPP network. The AMF assigns a temp ID for the authorized UAV during the service request (after successful UUAA procedure). The detailed procedure is followed as given in the first alternative.

The AMF can get an authentication message request from a UE over NAS message, which contains:

CAA level UAV ID, which need to be sent to the UTM for the ID identification;

The location information provided by UE (e.g., GPS location), which need to be transparently sent to UTM and used to be compared with the trusted positioning information by UTM; and/or The flight path provided by UE can be planned flight path which may be checked by UTM.

Step 1: AMF keeps track of the mobility and service status of the UAV UE during its service period. AMF triggers a temp ID update procedure by checking the current service status of the UAV UE and by considering the current temp ID lifetime expiration.

After a particular interval of time the AMF triggers the temp ID re-allocation procedure in order to avoid the tracking of UAV UE's broadcasting ID.

Step 2. AMF sends the Temp ID update request message to the UAV UE. The temp ID update request message includes the lifetime status of current temp ID (indication of expiry).

Step 3: UAV UE verifies the stored lifetime status and if there is no service interruption, UAV UE sends the acknowledgement to AMF over the NAS message.

Step 4: based on UAV UE's acknowledgement, AMF assigns a new temp ID with its lifetime. The old temp ID is maintained until its lifetime is expired.

Step 5: AMF provides the newly assigned Temp ID along with its lifetime to UAV UE in the Temp ID update response message via NAS message.

Step 6a-6b: AMF provides the newly assigned temp ID along with its lifetime to UAV C and UTM/USS (AMF provides the updated Temp ID details to NEF and NEF forwards the updated Temp ID details to the UTM)

Step 7a-7b: UAVC and UTM/USS stores the newly assigned temp ID along with its lifetime.

Figure 7A:
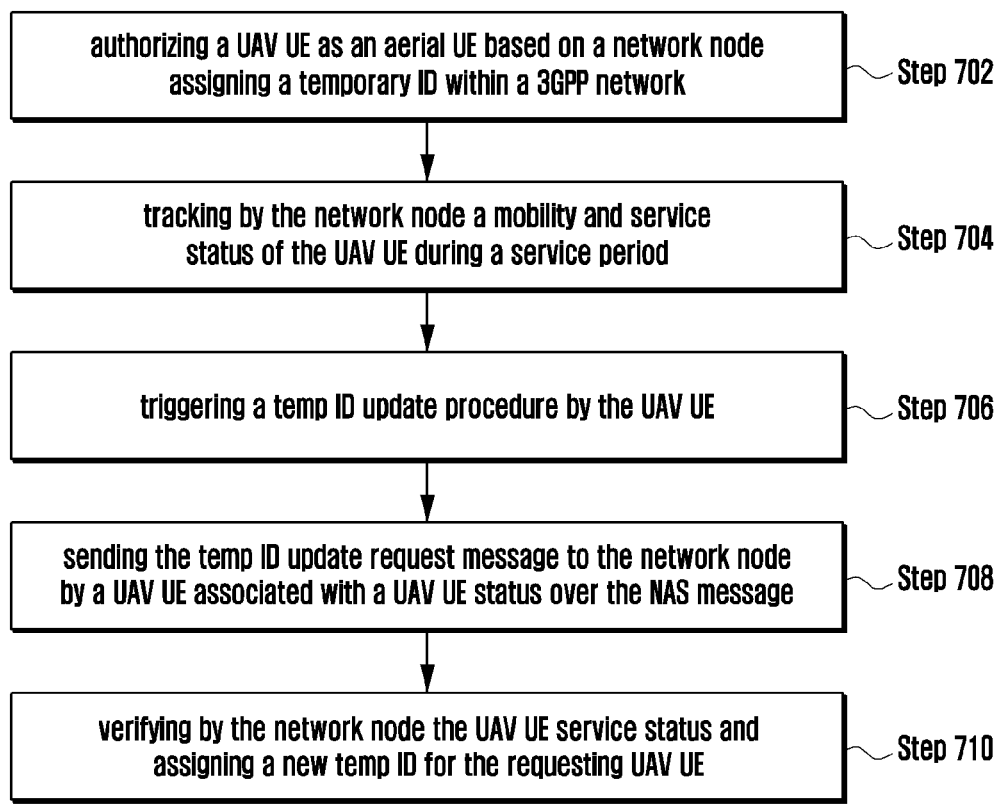
FIGS. 7A and 7B illustrate temp ID re-allocation triggered by UAV UE in accordance with an embodiment of the present disclosure.
Figure 7B:
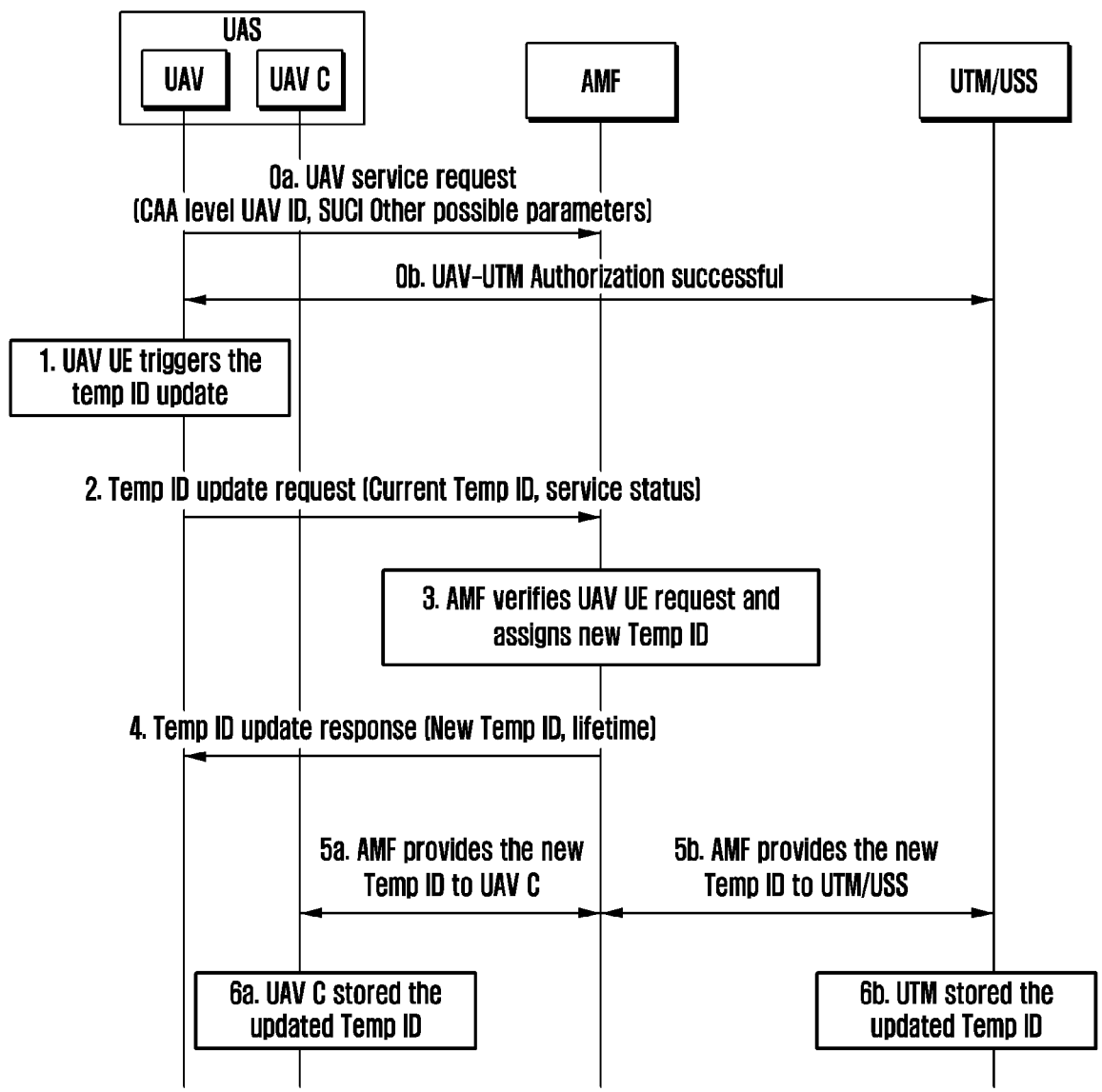

FIGS. 7A and 7B illustrate Temp ID re-allocation triggered by UAV UE in accordance with an embodiment of the present disclosure.

FIG. 7A illustrates a method for temporary ID re-allocation triggered by UAV UE in a 3GPP network.

The method comprises authorizing (step 702) a UAV UE as an aerial UE based on an access and mobility management function (AMF) assigning a temporary ID within a 3GPP network.

The AMF tracks (step 704) a mobility and service status of the UAV UE during a service period.

The UAV UE triggers (step 706) a temp ID update procedure. As a result, the temp ID update request message is sent (step 708) to the AMF by a UAV UE associated with a UAV UE status over the NAS message based on including a current temp ID and a UAV service status.

The AMF verifies (step 710) the UAV UE service status and assigns a new temp ID for the requesting UAV UE upon receiving a mobility registration update Temp ID update request from the UAV UE.

FIG. 7B illustrates Temp ID re-allocation triggered by UAV UE in accordance with an embodiment of the present disclosure.

The present implementation refers an alternative-6 referred by re-allocation from the client (UAV UE).

In this alternative the temp ID is considered as the broadcasting identifier which can be periodically refreshed by the network. The UAV UE triggers the periodic temp ID update request to the AMF to prevent the tracking of UAV UE during its service period. Upon receiving the request, the AMF assigns new temp ID for the requesting UAV by performing the re-allocation procedure.

In this alternative, Temporary ID=Broadcasting ID=<PLMN ID><IMEI><UTM ID><RAND>.

In another embodiment, the Temporary ID=Broadcasting ID=<PLMN ID><IMEI><UTM ID><COUNTUAV>.

In one example, Temp ID is provided by the UTM for each UAV traffic session and it is known to the 3GPP network.

In one example, using PLMN ID, the receiver can obtain the details about the network in which the initiating UAV is authorized for.

In one example, UTM ID is used to differentiate, in case if there are multiple UTM available in the region In one example, the UAV and the AMF associates a counter, CounterUAV, with the Temp ID. The CounterUAV can be incremented by the AMF for every new computation of the Temp ID. The CounterUAV is used as freshness parameter for Temp ID generation, to mitigate the replay attack and tracking of the broadcasting ID, which is used for remote identification. The UE and the AMF maintains the CounterUAV for lifetime of the Temp ID.

The UAV initializes the CounterUAV to "0" when the Temp ID is allotted.

The UAV only accepts the CounterUAV value that is greater than stored CounterUAV value.

The UAV and the AMF maintains the CounterUAV for lifetime of the previously allotted Temp ID.

As a part of detailed procedure, following steps take place:

Step 0a-0c: The UAV is authorized as an aerial UE with the help of UTM and 3GPP network. The AMF assigns a temp ID for the authorized UAV during the service request (after successful UUAA procedure). The detailed procedure is followed as given in the first alternative.

The AMF can get Authentication Message request from UE over NAS message, which contains:
 CAA level UAV ID, which need to be sent to the UTM for the ID identification.
 The location information provided by UE (e.g., GPS location), which need to be transparently sent to UTM and used to be compared with the trusted positioning information by UTM.
 The flight path provided by UE can be planned flight path which may be checked by UTM.

Step 1: In particular interval of time (when the lifetime is about to expiry) the UAV UE triggers the temp ID update procedure in order to avoid the tracking of UAV UE's broadcasting ID.

Step 2: UAV UE sends the temp ID update request message to the AMF over the NAS message. The temp ID update request message includes the current temp ID and the UAV service status in order to avoid the service interruption.

Step 3: Upon receiving the mobility registration update/Temp ID update request from the UAV UE, the AMF verifies the UAV UE and assigns a new temp ID for the requesting UE.

Step 4: AMF provides the newly assigned Temp ID along with its lifetime to UAV UE in the Temp ID update response message via NAS message.

Steps 5a-5b: AMF provides the newly assigned temp ID along with its lifetime to UAV C and UTM/USS (AMF provides the updated Temp ID details to NEF and NEF forwards the updated Temp ID details to the UTM).

Steps 6a-6b: UAVC and UTM/USS stores the newly assigned temp ID along with its lifetime.

Figure 8A:
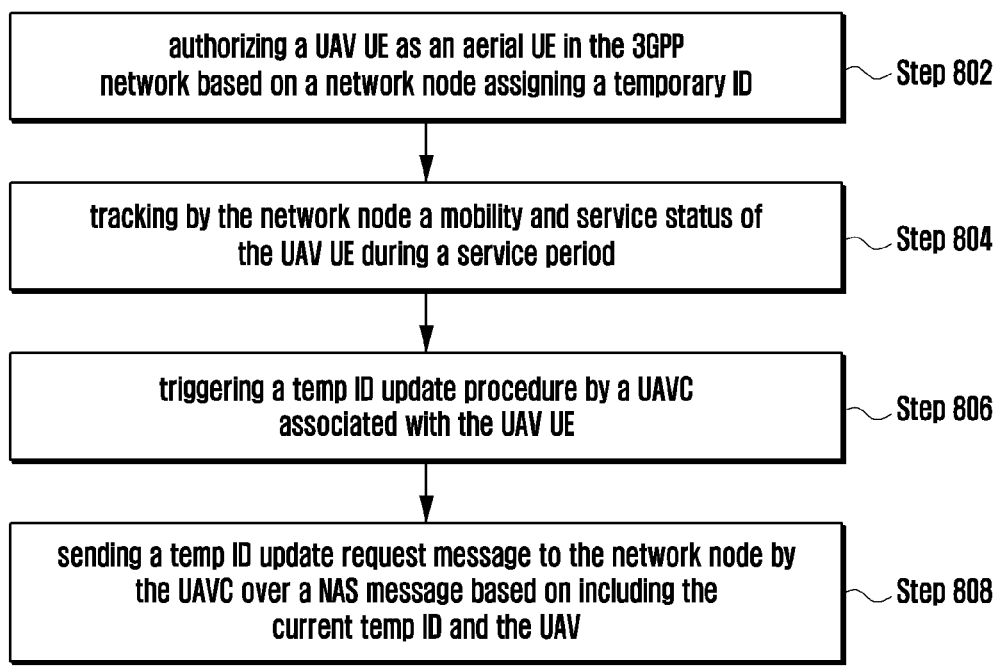
FIGS. 8A and 8B illustrate temp ID re-allocation triggered by UAV Controller in accordance with an embodiment of the present disclosure.
Figure 8B:
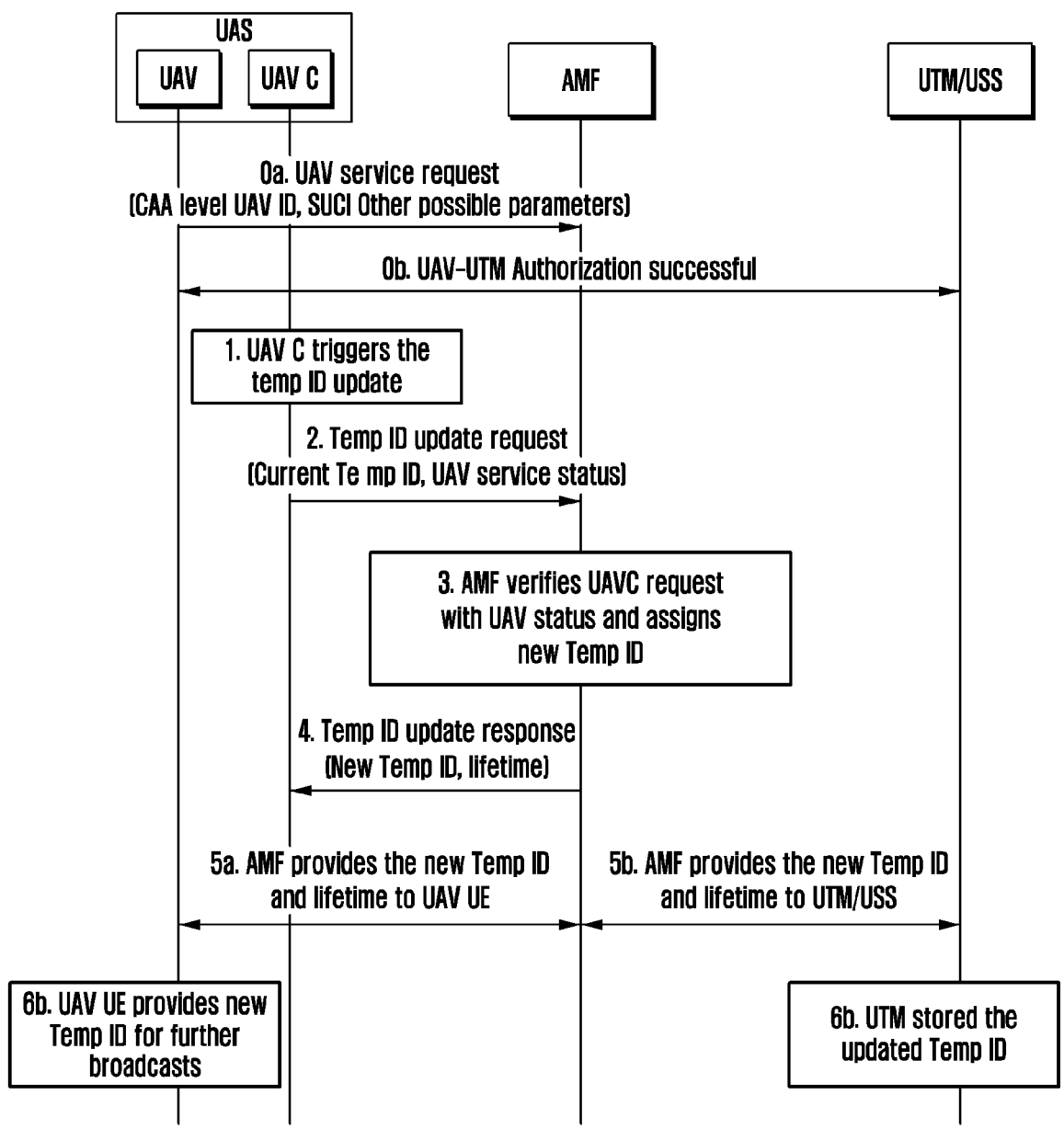

FIGS. 8A and 8B illustrates Temp ID re-allocation triggered by UAV Controller in accordance with an embodiment of the present disclosure.

FIG. 8A illustrates Temp ID re-allocation triggered by UAV Controller in accordance with an embodiment of the present disclosure.

The present disclosure refers a method for temporary ID re-allocation triggered by UAV controller (UAVC) in a 3GPP network. The method comprises authorizing (step 802) a UAV UE as an aerial UE in the 3GPP network based on an Access and mobility management function (AMF) assigning a temporary ID.

Further, the method comprises tracking (step 804) by an AMF a mobility and service status of the UAV UE during a service period.

Further, the method comprises triggering (step 806) a temp ID update procedure by a UAVC associated with the UAV UE.

Further, the method comprises sending (step 808) a temp ID update request message to the AMF by the UAVC over a NAS message based on including the current temp ID and the UAV service status.

FIG. 8B illustrates Temp ID re-allocation triggered by UAV controller in accordance with an embodiment of the present disclosure.

The present implementation may be referred as re-allocation trigger from UAV controller defined by alternative 7

In this alternative 7, the temp ID is considered as the broadcasting identifier which can be periodically refreshed by the network. The UAV Controller triggers the periodic temp ID allocation request to the AMF to prevent the tracking of UAV UE during its service period.

In this alternative, Temporary ID=Broadcasting ID=<PLMN ID><IMEI><UTM ID><RAND>.

In another embodiment, the Temporary ID=Broadcasting ID=<PLMN ID><IMEI><UTM ID><COUNTUAV>.

In one example, Temp ID is provided by the UTM for each UAV traffic session and it is known to the 3GPP network.

In another example, using PLMN ID, the receiver can obtain the details about the network in which the initiating UAV is authorized for.

In yet another example, UTM ID is used to differentiate, in case if there are multiple UTM available in the region.

In yet another example, the UAV and the AMF associates a counter, CounterUAV, with the Temp ID. The CounterUAV can be incremented by the AMF for every new computation of the Temp ID. The CounterUAV is used as freshness parameter for Temp ID generation, to mitigate the replay attack and tracking of the broadcasting ID, which is used for remote identification. The UE and the AMF maintains the CounterUAV for lifetime of the Temp ID.

The UAV initializes the CounterUAV to "0" when the Temp ID is allotted.

The UAV only accepts the CounterUAV value that is greater than stored CounterUAV value.

The UAV and the AMF may maintain the CounterUAV for lifetime of the previously allotted Temp ID.

As a part of detailed procedure, following steps take place:

Step 0a-0c: the UAV is authorized as an aerial UE with the help of UTM and 3GPP network. The AMF assigns a temp ID for the authorized UAV during the service request (after successful UUAA procedure). The detailed procedure is followed as given in the first alternative.

The AMF can get authentication message request from UE over the NAS message, which contains:

CAA level UAV ID, which need to be sent to the UTM for the ID identification;

The location information provided by UE (e.g., GPS location), which need to be transparently sent to UTM and used to be compared with the trusted positioning information by UTM;

The flight path provided by UE can be planned flight path which may be checked by UTM.

Step 1: In particular interval of time (when the lifetime is about to expiry) the UAV controller triggers the temp ID re-allocation procedure in order to avoid the tracking of UAV UE's broadcasting ID.

Step 2: UAV controller sends the temp ID update request message to the AMF. The temp ID update request message includes the current temp ID and the UAV service status in order to avoid the service interruption.

Step 3: upon receiving the mobility registration update/Temp ID update request from the UAV controller, the AMF verifies the UAV C request and assigns a new temp ID for the requesting the UAV UE.

Step 4: AMF provides the newly assigned Temp ID along with its lifetime to UAV C in the Temp ID update response message.

Steps 5a-5b: AMF provides the newly assigned temp ID along with its lifetime to UAV UE over the NAS message and UTM/USS (AMF provides the updated Temp ID details to NEF and NEF forwards the updated Temp ID details to the UTM).

Steps 6A-6B: UAV UE uses the received new temp ID for further broadcasts and UTM/USS stores the newly assigned temp ID along with its lifetime.

In another embodiment, the UTM performs the mapping of temp ID and CAA level ID. Also, the UTM allocates the periodic temp ID for the UAV UE in order to prevent the tracking in its service period. i.e., when the lifetime of current temp ID is about to expire, the UTM triggers the re-allocation procedure for the temp ID. Also, UTM informs the 3GPP system and the UAV controller about the assignment of new temp ID in order to maintain the service interruption.

In an embodiment, the old temp ID is still maintained at the UAV C and the UTM/USS, until the UAV UE successfully starts using the new Temp ID. Based on the UAV UE's request (in order to avoid service interruption), the UAV C and UTM/USS deletes the old Temp ID and started using the new temp ID for further remote identification and tracking.

In another embodiment, 5G-GUTI is considered as an external identifier which is used as 3GPP UAV ID to reach the UTM/USS, if and only in case it is possible for a 3GPP network to provide 5G-GUTI to an external entity (for e.g., UTM/USS).

In another embodiment, the correlation of the 3GPP UAV ID (for e.g., GPSI as an external ID) and CAA level UAV-ID is performed by the USS/UTM.

In another embodiment, the USS/UTM can for example bind the Temp ID generated for broadcasting purpose to both 3GPP UAV ID and CAA UAV level ID.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a temporary identification (ID) in a 3rd generation partnership project (3GPP) network, the method comprising:

receiving, by an uncrewed aerial vehicle (UAV) traffic management (UTM) via the 3GPP network, a service request message from an authorized UAV;

assigning, by the UTM, a temporary ID to the UAV based on receiving the service request;

performing, by the UTM, a mapping of a stored civil aviation authority (CAA) level UAV ID for an authorized UAV UE with the assigned temporary ID for tracking and remote identification of the UAV UE;

sending, by the UTM, a service accept message to the UAV, the service accept message comprising the temporary ID along with lifetime information of the temporary ID.

2. The method of claim 1 further comprises:

initiating, by the UAV, a broadcast message announcing a UAV service comprising UAV service messages and temporary ID along with the lifetime information;

receiving, by a public service UE (UEX), the broadcast message from the UAV;

accepting, by the UEX, the broadcast message when UAV's service is required; and receiving, by an initiating UAV UE, response messages from UAVs delivering services along with the lifetime information.

3. The method of claim 2, wherein initiating the broadcast message by the UAV comprises:

forming the broadcast message for a particular UAV service;

calculating a message integrity code (MIC) when an integrity key for a UAV message broadcast (IKUMB) is provided by the UTM or setting the MIC to a null when the integrity key for the IKUMB is not provided by the UTM;

adding message-specific confidentiality to the broadcast message with an UTM ID, when a confidentiality key for UAV message broadcast (CKUMB) was received; and performing a scrambling operation over the message when a scrambling key for a UAV message broadcast (SKUMB) was received from the UTM.

4. The method of claim 3, wherein receiving the broadcast message comprises:

removing the scrambling operation when the SKUMB was received from the UTM;

checking for matching on bits of the broadcast message that are not encrypted using message-specific confidentiality and aborting in case of not matching; and removing the message-specific confidentiality when the CKUMB was received from the UTM.

5. The method of claim 4, wherein the MIC is calculated for the broadcast message based on at least one of a message type, a CAA level UAV ID, a temporary ID, an UTC-based counter, or an UTM ID.

6. The method of claim 5, wherein performing the scrambling operation comprises:

setting least significant bits (LSBs) of a UTC-based counter to a zero;

computing a time-hash-bit sequence from the SKUMB and the UTC-based counter passed through a keyed hash function; and performing an exclusive OR (XOR) operation for a time-hash-bit sequence with the broadcast message comprising the MIC.

7. The method of claim 6, further comprising performing a prior execution of an authentication and authorization (A&A) procedure between the UAV and an UTM service supplier (USS)/UTM (USS/UTM), wherein a 3GPP network provides a communication between the UAV and the USS/UTM, wherein the prior execution comprises:

initiating, by the UAV, a primary authentication operation to the 3GPP network for a mutual authentication operation between the UAV UE and the 3GPP network based on the primary authentication operation that is successfully performed, and providing a mutual authentication operation between an unmanned aerial system application function (UAS AF) and the USS/UTM, and wherein the mutual authentication operation between the UAS AF and the USS/UTM based on a network exposure function (NEF) framework comprising:

providing a mapping of 3GPP UAV ID and the CAA level UAV ID to the UAS AF, and providing a mapping of the CAA level UAV ID and a temporary ID to the UAS AF.

8. The method of claim 1, further comprising:

authorizing, by the UTM, a UAV as an aerial UE within the 3GPP network;

tracking, by a network node, a mobility and a current service status of an UAV UE;

triggering, by the network node, a temporary ID update procedure by checking the current service status of the UAV UE and an expiry of an existing temporary ID lifetime;

triggering, by the network node, a temporary ID re-allocation procedure at an interval of time;

sending, by the network node, a temporary ID update request message to the UAV UE; and sending, by the UAV UE, an acknowledgment by indicating the current service status.

9. The method of claim 8, wherein the UAV is authorized through the network node identified by an access and mobility management function (AMF) assigning a temporary ID and informing the assigned temporary ID to the UTM, the method further comprising:

based on UAV UE's acknowledgement, assigning by the AMF a new temporary ID with a lifetime;

setting a format of the temporary ID comprising at least one of: a public land mobile network identification (PLMN ID), an international mobile equipment identity (IMEI), an UTM ID, a counter UAV (COUNTUAV), or a random number (RAND);

providing, by the AMF, the assigned temporary ID along with the lifetime to the UAV UE in a temporary ID update response message; and storing, by an uncrewed aerial vehicle controller (UAVC) and UTM/UTM service supplier (USS) (UTM/USS) the assigned temporary ID along with the lifetime.

10. The method of claim 1, further comprising:

authorizing the UAV UE as an aerial UE based on a network node assigning a temporary ID within the 3GPP network;

tracking, by the network node, a mobility and a service status of the UAV UE during a service period;

triggering, by the UAV, a temporary ID update procedure;

sending a temporary ID update request message to the network node by a UAV UE associated with a UAV UE status over a non-access stratum (NAS) message based on including a current temporary ID and a UAV service status; and verifying, by the network node, the UAV service status and assigning a new temporary ID for requesting the UAV UE in response to receiving a mobility registration update temporary ID update request from the UAV UE.

11. The method of claim 10, further comprising:

setting a temporary ID format comprising at least one of a public land mobile network identification (PLMN ID), an international mobile equipment identity (IMEI), an UAV traffic management (UTM ID), a counter UAV (COUNTUAV), or a random number (RAND);

providing, by an access and mobility management function (AMF), the assigned temporary ID along with a lifetime to the UAV UE in a temporary ID update response message;

providing, by the AMF, the assigned temporary ID along with the lifetime to a UAV controller (UAVC) and UTM/USS; and storing, by the UAVC and UTM/USS, the assigned temporary ID along with the lifetime, wherein the network node is identified by an access and mobility management function (AMF).

12. The method of claim 1, further comprising:

authorizing a UAV UE as an aerial UE in the 3GPP network based on a network node assigning a temporary identification (ID);

tracking, by the network node, a mobility and a service status of the UAV UE during a service period;

triggering a temporary ID update procedure by a UAV controller (UAVC) associated with the UAV UE; and sending a temporary ID update request message to the network node by the UAVC over a non-access stratum (NAS) message based on including a current temporary ID and the service status of the UAV.

13. The method of claim 12, further comprising:

upon receiving a mobility registration update or a temporary ID update request from the UAVC, verifying, by an AMF, the service status of the UAV and assigning a new temporary ID for requesting the UAVC;

setting a temporary ID format comprising at least one of a public land mobile network identification (PLMN ID), an international mobile equipment identity (IMEI), an UAV traffic management (UTM ID), a counter UAV (COUNTUAV), or a random number (RAND);

providing, by the AMF a newly assigned temporary ID along with a lifetime to the UAVC in a temporary ID update response message;

providing, by the AMF, the newly assigned temporary ID along with the lifetime to an UTM/UTM service supplier (USS) (UTM/USS);

using, by the UAV UE the newly assigned temporary ID for broadcasting messages; and storing, by the UTM/USS, the newly assigned temporary ID along with the lifetime, wherein the network node is identified by an access and mobility management function (AMF).

14. The method of claim 12, further comprising:

triggering a re-allocation procedure for the temporary ID before the current temporary ID expires; and providing, by an AMF, a newly assigned temporary ID along with a lifetime to a UTM, the UAV UE, and the UAVC.

15. The method of claim 12, further comprising:

maintaining an existing temporary ID in an active status at the UAVC and a UTM/USS until the UAV UE successfully starts using a new temporary ID; and deleting, by the UAVC and UTM/USS, an old temporary ID and using the new temporary ID for a remote identification and tracking operation.

16. A system for a temporary identification (ID) in a 3rd generation partnership project (3GPP) network, the system comprising:

an uncrewed aerial vehicle (UAV) user equipment (UE) (UAV UE); and a UAV traffic management (UTM), wherein the UTM is configured to:

receive, by an uncrewed aerial vehicle (UAV) traffic management (UTM) via the 3GPP network, a service request message from an authorized UAV, assign, by the UTM, a temporary ID to the UAV based on receiving the service request, perform, by the UTM, a mapping of a stored civil aviation authority (CAA) level UAV ID for an authorized UAV UE with the assigned temporary ID for tracking and remote identification of the UAV UE, and send, by the UTM, a service accept message to the UAV, the service accept message comprising the temporary ID along with lifetime information of the temporary ID.

* * * * *